Feb. 15, 1938.     J. R. GRAVES     2,108,331
HANDWHEEL
Filed March 13, 1937
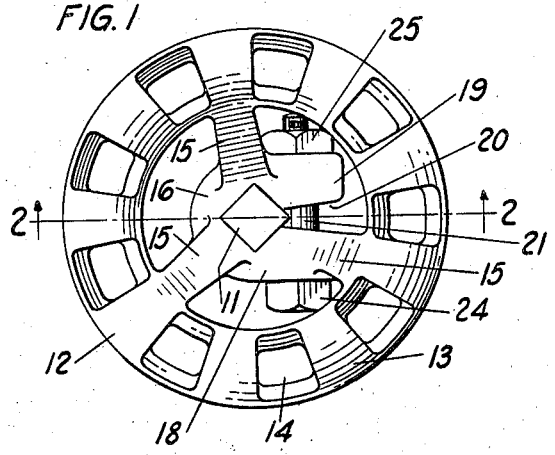
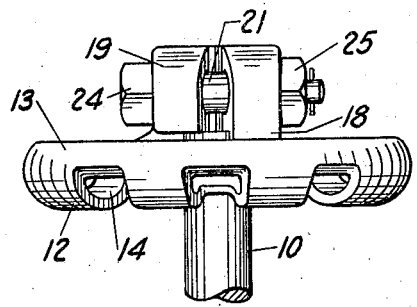
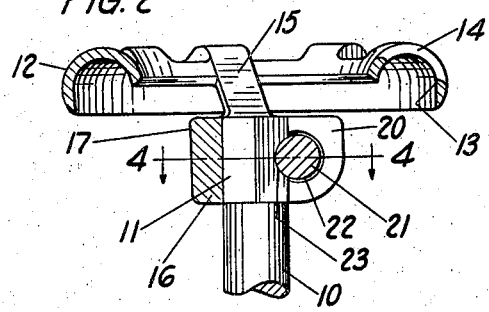
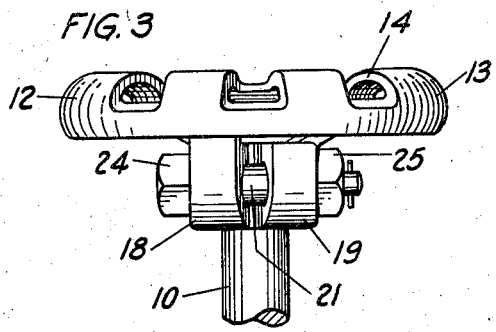
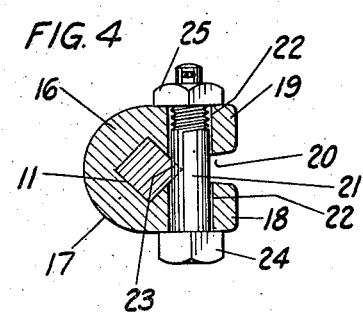
INVENTOR
JOHN R. GRAVES
BY Walter E. Wallheim
ATTORNEY Patented Feb. 15, 1938

2,108,331

UNITED STATES PATENT OFFICE 2,108,331

HANDWHEEL

John R. Graves, Bergenfield, N. J.

Application March 13, 1937, Serial No. 130,654

1 Claim. (Cl. 287—53)

This invention relates to hand wheels, particularly the kind which are fastened to valve stems or the like for the purpose of facilitating their manual operation.

It is the principal object of the invention to provide a hand wheel of this kind with means which permit the wheel to be easily connected to a valve stem.

Another object is to make possible the disconnecting of the wheel from the stem without damaging the stem.

A further object is to provide a fastening means between the wheel and stem which securely holds the wheel in place irrespective of slight variations in their contacting surfaces.

Other objects will become apparent in the following specification and the accompanying drawing in which a preferred embodiment of the invention is shown.

In the drawing,

Fig. 1 is a plan view of the hand wheel fastened to a valve stem;

Fig. 2 is a longitudinal sectional view of the same along the plane of line 2—2 in Fig. 1 showing a fragmentary part of the stem;

Fig. 3 is a side view;

Fig. 4 is a cross-sectional view along the plane of line 4—4 in Fig. 3; and

Fig. 5 shows an elevational view of a modified application of the hand wheel to the stem.

Like characters of reference denote similar parts throughout the several views and the following specification.

10 is an end portion of a valve stem having its terminal squared at 11.

12 is a hand wheel consisting of a rim 13 of arcuate cross-section open at its bottom and having a plurality of openings 14. 15 are radially disposed spokes connecting the rim 13 with a center hub 16.

Hub 16 is semicircular at one side at 17 and has a lug 18 and a lug 19 parallel to each other at its other side. The center of the hub has a square recess tightly fitting over the square end 11 of the stem and entirely surrounds it except for a space 20 between the inner opposed faces of lugs 18 and 19 which are slightly converging toward the stem.

It will be noted that lug 18 is rigidly connected to one of the spokes 15 of the hand wheel, forming practically an integral unit therewith, while lug 19 projects freely from the hub 16 without any additional support.

21 is a bolt fitted into corresponding holes 22 across the two lugs 18 and 19, so disposed that a portion of its diameter projects slightly into the square end 11 of the stem 10 at 23, as clearly shown in Figs. 2 and 4. 24 is a head of the bolt contacting with the outer face of lug 18, and 25 is a nut screwed onto the threaded end of bolt 21 and against the outer face of lug 19.

The application of the hand wheel to the stem is a very simple one. The hub 16 of the wheel is slipped over the square end 11 of the stem to a position in which the arcuate groove 23 of the stem registers with drilled holes 22 through the lugs 18 and 19. The bolt 21 is then inserted and the nut 25 screwed upon the threaded end of the bolt and tightly against the outer face of the lug 19. This causes the hub of the wheel to be tightly secured to the stem laterally, and simultaneously that portion of the bolt 21 which projects into the stem at 23 effectively prevents longitudinal dislodgment of the wheel. Close contact between the hub and the square end of the stem can be obtained by virtue of the fact that lug 19 is free to flex slightly when the bolt and nut are tightened, while lug 18 is held rigidly by one of the spokes of the wheel.

To disconnect the hand wheel from the stem, it is only necessary to unscrew the nut 25 and withdraw the bolt 21 from lugs 18 and 19, when the wheel can be easily removed by blows against its underside without causing any marring of the stem.

While I have shown a preferred embodiment of the invention in Figs. 1 to 4 of the drawing, it is obvious that many changes can be made in its construction. So, for instance, in Fig. 5 is shown the same style of a hand wheel but applied to a stem in a reversed position where this should be found expedient. Moreover, the hand wheel instead of being made round and with openings in its rim which cause the wheel to be air-cooled, the same could be made solid and of any desired shape convenient for handling. The square end of the stem could be of any other desired polygonal or irregular cross-section. It may also be round, blank or threaded. If threaded, the hub 16, of course, will be threaded correspondingly.

It is understood that various other changes of form, proportions and minor details of construction may be resorted to without departing from the principles or sacrificing any of the advantages of the invention as defined in the appended claim.

What I claim as new, is:

A hand wheel having an offset hub adapted to be non-rotatably secured to a valve stem, said hub having a radial slot and a pair of lugs defining the said slot between them, the said lugs having outer faces parallel to each other, one of said lugs being connected with the wheel throughout its length and the other lug having a free end, a bolt transversely across the said lugs adapted to draw the lugs together and bind the hub tightly upon an end of the stem and to engage a groove in and transversely across the said end to prevent longitudinal dislodgment between the said wheel and stem.

JOHN R. GRAVES.